Sept. 23, 1958　　H. A. SCHLATTER ET AL　　2,852,985
APPARATUS FOR REMOVING BURRS FROM FLASH
BUTT-WELDED, PROFILED WORK PIECES
Filed April 27, 1954

INVENTORS:
HANS ALFRED SCHLATTER
EMIL WEGMANN
BY Leon M. Strauss
AGT.

United States Patent Office 2,852,985
Patented Sept. 23, 1958

2,852,985

APPARATUS FOR REMOVING BURRS FROM FLASH BUTT-WELDED, PROFILED WORK PIECES

Hans Alfred Schlatter and Emil Wegmann, Zollikon, Switzerland

Application April 27, 1954, Serial No. 425,882

Claims priority, application Switzerland April 28, 1953

4 Claims. (Cl. 90—24)

This invention relates to means for trimming off burrs from work pieces to finish same.

In the flash butt welding of profiled work pieces there is formed, at the welding position, an upset burr which, in most cases, has to be removed. The removal of this upset burr has hitherto generally been carried out in a rather troublesome and tedious manner by means of files or chisels. By means of the present invention, this drawback is obviated and a clean and rapid removal of the upset burr of flash butt-welded, profiled work pieces is rendered possible.

The present invention relates to an apparatus for removing such upset burrs from flash butt-welded, profiled work pieces, and is characterized by a clamping device for firmly holding the work piece, a tool support which is displaceable, in relation to the said clamping device, longitudinally of the work piece, a trimming knife which includes at least two parts and fits the profile of the work piece and completely surrounds it, and driving means for producing relative movement between the clamping device and the tool support.

By means of this apparatus, upset burrs from flash butt-welded work pieces, such as shafts, rails, and girders, can be rapidly and cleanly cut off, a finishing of the surface of the cut being superfluous.

Two embodiments of the subject matter of the invention are represented diagrammatically in the accompanying drawing, wherein.

Figure 1:
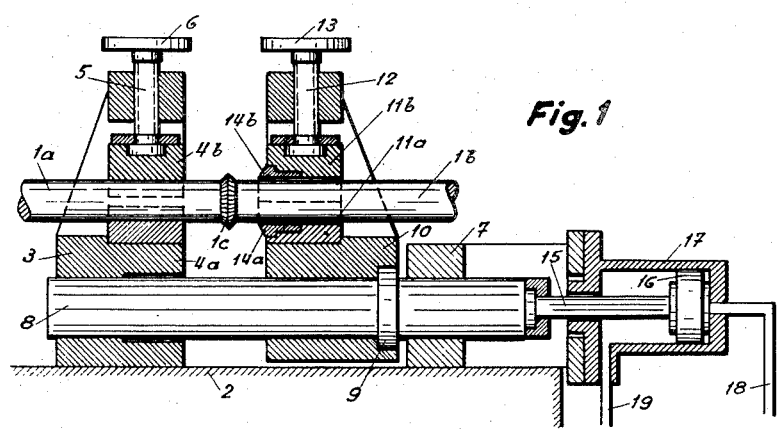
Fig. 1 is an axial section through a first embodiment of the invention for removing the upset burr from flash butt-welded, profiled work pieces.

1a and 1b denote the parts of a profiled work piece, a shaft in the case represented, which are to be welded together by flash butt welding, and 1c denotes the upset burr located between these parts 1a and 1b. Mounted on a bed 2 is a frame 3, in which two clamping jaws 4a and 4b are arranged. The jaw 4a is firmly supported on the bottom part of the frame 3, while the jaw 4b is rotatably mounted on the bottom end of a screw-threaded spindle 5 which can be moved in a screw-thread in the top part of the frame 3 and the top end of which is provided with a hand wheel 6. On a guiding axle 8, which is axially displaceably guided, on the one hand, in the bottom part of the frame 3 and, on the other hand, in a guiding support 7, which is rigidly arranged on the bed 2, a tool support 10 is fixed, axially undisplaceably, by means of a collar 9. Arranged in this tool support 10 are also two jaws 11a and 11b, the jaw 11a being fixedly supported o nthe bottom part of the tool support 10, while the jaw 11b is rotatably mounted on the bottom end of a screw-threaded spindle 12, which can be moved in a screw-thread in the top part of the tool support 10 and the top end of which is provided with a hand wheel 13. On the side facing the frame 3, there are inserted in the jaws 11a and 11b two parts 14a and 14b of a trimming knife made of steel which consists of two parts and the blades of which are shaped in such a manner that they can rest against the profile of the work piece to be deburred and completely surround it when the jaws 11a and 11b rest on the work piece. Fixed to the end of the guiding axle 8 which lies in the guiding support 7 is the piston rod 15 of a piston 16 which is displaceable in a cylinder 17 that is mounted on the guiding support 7. With this cylinder 17, two pressure pipes 18 and 19 communicate in such a manner that the piston 16 can be acted upon on both sides with pressure medium, for example oil, and can be displaced in the cylinder 17.

By acting upon it with pressure medium from the pressure pipe 19, the piston 16 is brought into its outer limiting position in the cylinder 17 and thus the guiding axle 8 is, together with the tool support 10, brought into such a position through the piston rod 15 that the said tool support 10 is at the greatest possible distance from the frame 3. The work piece, which consists of the two parts 1a and 1b is inserted into the apparatus in such a manner that its upset burr is located between the frame 3 and the tool support 10. The part 1a of the work piece is clamped undisplaceably between the jaws 4a and 4b, while the jaws 11a and 11b can be advanced toward part 1b only to such an exten tthat the parts 14a and 14b of the trimming knife rest fully on the said part 1b without gripping it. The piston 16 is now acted upon with pressure medium through the pressure pipe 18 on the other side, with the result that the guiding axle 8 is, together with the tool support 10 mounted thereon, displaced in such a manner in its guides in the bottom part of the frame 3 and in its guiding support 7 that the tool support 10 is displaced towards the frame 3. The parts 14a and 14b of the trimming knife, which have been inserted in the jaws 11a and 11b, slide on the part 1b of the work piece that is completely surrounded by them and, when they arrive at the upset burr 1c, they shear it off smoothly from the profile of the work piece so that no projecting parts remain.

Figure 2:
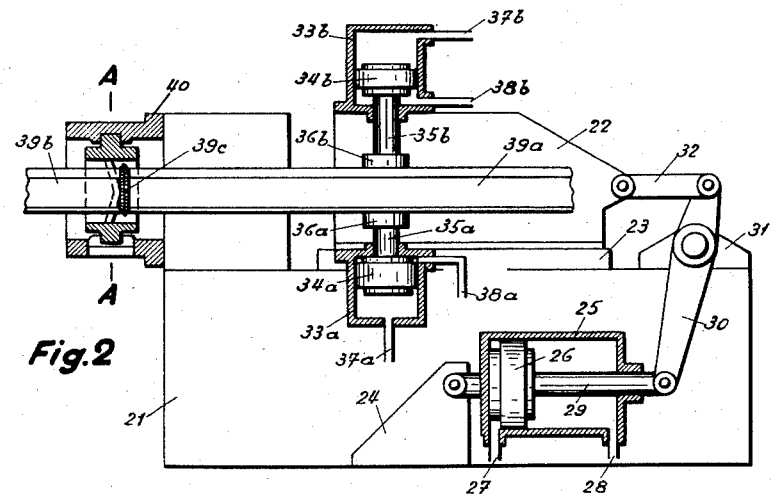
Fig. 2 is an axial section through a second embodiment of such an apparatus.
Figure 3:
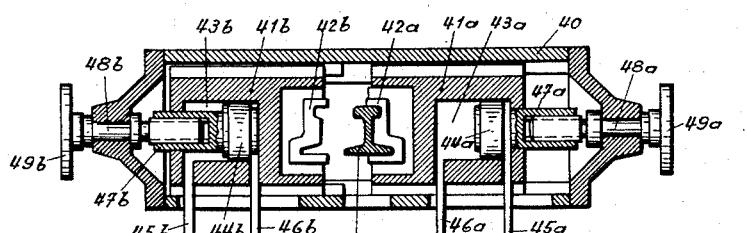
Fig. 3 is a section on the line A—A of Fig. 2 on an enlarged scale.

In the embodiment represented in Figs. 2 and 3, of the apparatus for removing the upset burr from flash butt-welded, profiled work pieces, 21 denotes a bed on which a frame 22 is displaceably guided in a guide 23. Hingedly mounted in the bed 21 on a support 24 is a cylinder 25 in which a piston 26 is displaceable. The piston can be acted upon on both sides with pressure medium, for example oil, for which purpose two pressure pipes 27 and 28 communicate with the cylinder 25. The piston rod 29 of the piston 26 is hinged to the end of an arm of a two-armed lever 30 which is mounted in a bearing 31 on the bed 21. Hinged to the end of the other arm of the said lever 30 is one end of a link 32, the other end of which is hingedly connected with the frame 22. Arranged in the frame 22 is a hydraulic clamping device having two pressure cylinders 33a and 33b which are rigidly mounted on the said frame 22 and in which are displaceable pistons 34a and 34b, respectively, which act on jaws 36a and 36b through piston rods 35a and 35b, respectively. Two pipes 37a and 38a communicate with the pressure cylinder 33a and two pressure pipes 37b and 38b communicate with the pressure cylinder 33b in such a manner that the pistons 34a and 34b can be acted upon with pressure medium on both sides. The jaws 36a and 36b serve for clamping a work piece which consists of the parts 39a and 39b which are connected together at 39c by flash butt welding. Rigidly arranged on the bed 21 is a tool support 40 in which two sliding members 41a and 41b are displaceably guided in guides perpendicularly to the longitudinal direction of the work piece 39a, 39b. The said two sliding members 41a and 41b possess, on their sides which face each other, recesses in which the parts 42a and 42b of a trimming knife are held. The sliding members 41a and 41b have cylindrical spaces 43a and 43b, respectively, in which pistons 44a and 44b, respectively, are displaceable. These pistons 44a and 44b can be acted upon on both sides with pressure medium, for which purpose two pressure pipes 45a and 46a communicate with the cylindrical space 43a and two pressure pipes 45b and 46b communicate with the cylindrical space 43b. The two pistons 44a and 44b have extensions 47a and 47b, respectively, which project outside the sliding members 41a and 41b, respectively, and which are provided with internal screw-threads into which the screw-threads of screw-threaded spindles 48a and 48b, which are provided with hand wheels 49a and 49b, respectively, and which are rotatably but axially undisplaceably mounted in the tool support 30, are screwed.

The parts 42a and 42b of a trimming knife which corresponds to the profile of the work piece to be deburred are inserted into the recesses of the sliding members 41a and 41b and the pistons 44a and 44b are, by means of the hand wheels 49a and 49b and the screw-threaded spindles 48a and 48b, brought into such a position that the parts 42a and 42b of the trimming knife close, at the centre of the tool support 40, round the profile of the work piece to be deburred, when the sliding members 41a and 41b are located in their inner limiting position, i. e., when the pistons 44a and 44b are acted upon on the inside with pressure medium, as represented in the righthand half of Fig. 3. When the sliding members 41a and 41b have been brought into their outer limiting position, the work piece is introduced into the tool support and the sliding members 41a and 41b are brought into their inner limiting position by the pistons 44a and 44b being suitably acted upon with pressure medium, so that the parts 42a and 42b of the trimming knife lie fully on the whole profile of the work piece. The upset burr 39c of the work piece is then located between the trimming knife 42a, 42b and the frame 22. The frame 22 is, by the action upon the piston 26 with pressure medium, which is introduced into the cylinder 25 by the pressure pipe 28, brought into its limiting position, which is more remote from the tool support 40, and, by the action upon the pistons 34a and 34b with pressure medium, which is introduced by the pressure pipes 37a and 37b into the pressure cylinders 33a and 33b, the part 39a of the work piece is clamped tightly between the clamping jaws 36a and 36b. The cylinder 25 is now reversed, i. e., the piston 26 is acted upon with pressure medium which is introduced into the cylinder 25 by the pressure pipe 27; this causes the piston 26 to be displaced into its other limiting position, the piston 26, by means of its piston rod 29, the lever 30 and the link 32, displacing the frame 22 towards the tool support 40. The upset burr 39c of the work piece, which is clamped in the frame 22 between the jaws 36a and 36b and is taken along by the frame 22, is shown off the profile of the work piece by the stationary parts 42a and 42b of the trimming knife.

As represented in Fig. 2, the edges of the parts 42a and 42b of the trimming knife do not lie in one plane but make an angle with each other. The advantage of this is that the upset burr 39c is not shorn off as a closed ring, but is divided into two or more parts which drop off the work piece by themselves. The trimming knife may, if required, especially in the case of a work piece with a complicated profile, consist of more than two parts.

In the embodiment of the apparatus shown in Fig. 1, the parts of the trimming knife also cannot be inserted in the jaws 11a and 11b, but can only be supported on their side that faces the frame 3. It is also possible to arrange the parts of the trimming knife on the two jaws of a tongs-like holding device, in the mouth of which the work piece is mounted and which is placed on the tool support on the side facing the frame 3.

The displacement of the work piece in relation to the trimming knife for cutting off the upset burr may be effected hydraulically or pneumatically or any desired mechanical driving device may be provided.

The apparatus described for removing the upset burr from flash butt-welded, profile work pieces may be combined with an electrical flash butt-welding machine, in which case the upsetting mechanism of this welding machine may, with advantage, be made usable also for displacing the work piece in relation to the trimming knife.

Having thus described the invention what is claimed as new and desired to be secured by Letters Patent, is:

1. An apparatus for removing the upset burr from a flash butt-welded profiled work piece, comprising frame means including first cylinder means and first piston means cooperating with said first cylinder means, said first piston means serving to hold said work piece, a tool support provided with at least two relatively displaceable trimming knives, said tool support including means for adjusting the relative disposition of said knives for working upon said work piece, second cylinder means and second piston means cooperating with said second cylinder means and disposed on said tool support, said second piston means being operatively connected with said knives for adjusting the relative disposition of said trimming knives in moving from operative to inoperative position, and means for displacing said frame means relative to said tool support, whereby upon adjusting the position of said knives and moving the latter to operative position, relative displacement of said frame means with respect to said tool support when said work piece is held by said frame means causes the burr on said work piece to be trimmed by said knives.

2. In an apparatus according to claim 1, said means for adjusting the relative disposition of said knives including hand wheel means for adjusting the position of said second piston means and said knives operatively connected with the latter.

3. In an apparatus according to claim 1, said first and second cylinder means and said first and second piston means including a pair of cylinders and a pair of pistons, respectively, said means for displacing said frame means relative to said tool support including a further cylinder and piston operating therein.

4. In an apparatus according to claim 1, said trimming knives having respective edges lying in different planes directed at an angle relative to each other.

References Cited in the file of this patent

UNITED STATES PATENTS

| 2,124,849 | Drain, Jr. | July 26, 1938 |
| 2,233,928 | Weaver | Mar. 4, 1941 |
| 2,272,737 | Chapman | Feb. 10, 1942 |
| 2,323,700 | Bailey | July 6, 1943 |
| 2,679,680 | Hanks | June 1, 1954 |

FOREIGN PATENTS

| 679,254 | Great Britain | Sept. 17, 1952 |